United States Patent [19]

Peery

[11] Patent Number: 4,827,107

[45] Date of Patent: May 2, 1989

[54] BATTERY-POWERED FOOD WARMER

[76] Inventor: William W. Peery, 6649 Van Gordon Ct., Arvada, Colo. 80004

[21] Appl. No.: 91,435

[22] Filed: Aug. 31, 1987

[51] Int. Cl.⁴ ............................................. H05B 3/68
[52] U.S. Cl. ..................................... 219/521; 219/386
[58] Field of Search ............... 219/521, 385, 386, 387, 219/436, 438

[56] References Cited

U.S. PATENT DOCUMENTS

| | | | |
|---|---|---|---|
| 1,380,579 | 6/1921 | Neff | 219/436 |
| 2,079,611 | 5/1937 | Harvey | 219/202 |
| 2,230,488 | 2/1941 | Gough | 219/429 |
| 2,252,191 | 8/1941 | Marks | 219/220 |
| 2,282,078 | 5/1942 | Morey | 219/436 |
| 2,851,943 | 9/1958 | Smagula | 99/339 |
| 3,105,138 | 9/1963 | Gazdik | 219/386 |
| 3,125,663 | 3/1964 | Hoffman | 219/345 |
| 3,130,288 | 4/1964 | Monaco et al. | 219/385 |
| 3,804,076 | 4/1974 | Fant | 126/261 |
| 3,931,494 | 1/1976 | Fisher | 219/521 |
| 3,998,143 | 12/1976 | Frye | 219/436 |
| 4,065,660 | 12/1977 | Berard | 219/436 |

Primary Examiner—Teresa J. Walberg
Attorney, Agent, or Firm—Ralph F. Crandell

[57] ABSTRACT

A food serving device for holding and serving a warm food product such as bread or rolls includes a flexible wrapper within a receptacle for holding the food product. A battery powered heater applies heat to the receptacle and wrapper and is located in a housing below the receptacle. The housing has a cover with heat transmitting openings.

6 Claims, 7 Drawing Sheets

Fig_2

Fig_7

Fig_8

Fig_9

Fig_6

Fig_10

Fig_11

Fig_12

Fig_13

Fig_14

Fig_15

Fig_16

Fig_17

Fig_18

Fig_19

Fig_20

Fig_21

Fig_22

Fig_23

Fig_24

Fig_25

BATTERY-POWERED FOOD WARMER

BACKGROUND OF THE INVENTION

1. Field of the Invention

The present invention relates to a battery-powered heated food receptacle finding particular, but not necessarily exclusive, use for keeping bakery goods, such as buns or bread, warm during the course of a meal. More particularly, the invention relates to a battery-powered bun warmer.

2. Description of the Prior Art

Two methods of serving warm bread or rolls are currently in widespread use. The most common is a wicker basket or other container lined with a table napkin that envelops the bread and rolls. The other is an electrically heated bowl or tray unit adapted to plug into an electrical outlet, providing heat in a covered bowl, basket, or pan in which the bread and rolls are served.

It is the presently preferred practice to serve heated breads, buns, muffins and the like from a basket or receptacle utilizing a napkin or cloth lining and cover for the bakery products. The bakery products are heated in an oven or warming oven, placed in the receptacle and wrapped with the cover. While the cover maintains the heat for a short period of time, during the course of a meal the bakery products cool, losing their desirable texture and characteristics.

The principal criticism of the wicker basket and napkin method is that the napkin used to cover the bread has little protective thermal effect and leaves many gaps, exposing the bread and rolls, allowing much of the inherent heat to escape. Electrically heated plug-in warmers are effective but awkward to use at a dining room table because of the necessity of a cord and the requirement of the availability of a nearby electrical outlet. Such a product would be prohibitive for restaurant service, as it is essentially immobile and has an inherent electrical shock capability.

A variety of plug-in devices have been suggested, including electrically heated warming trays and the like for maintaining the temperature and condition of heated casseroles, other hot dishes, and bakery products. The prior devices have generally suffered from both structural and aesthetic characteristics, principally being of metal or large cumbersome construction and utilizing heating elements requiring an extension cord to an electrical outlet. See, for example, U.S. Pat. No. 2,230,488 issued Feb. 4, 1941, to J. J. Gough, for "Bun Warmer."

Chafing dishes utilizing hot water have been utilized, as shown, for example, in U.S. Pat. No. 3,130,288 issued Apr. 21, 1964, to F. F. Monaco, et al., for "Food-service Device."

Battery-powered heaters have been utilized for a variety of applications as shown, for example, in U.S. Pat. No. 3,931,494, issued Jan. 6, 1976, to Fisher, et al., for "Rechargeable Battery Heating Unit," and U.S. Pat. No. 3,105,138, issued Sept. 24, 1963, to F. Gazdik, for "Battery Powered Heater for Conserves."

OBJECTS AND SUMMARY OF THE INVENTION

It is the principal object of this invention to provide a simple, lightweight bread or roll basket that is capable of maintaining hot breads in their heated, ready-to-eat condition. The basket is desirably light in weight, easily handled by a server, attractive for a dining table, and without a bulky or electric appliance appearance.

Another object of the present invention is to provide a bakery product warmer that is battery powered, light in weight and capable of maintaining bakery products at their optimum warm temperature.

A further object of the present invention is to provide a food warmer of the foregoing character that maintains the food product at its desired optimum temperature without overheating the same.

Still another object of the present invention is to provide a food warmer suitable for the dining table, which warmer utilizes a small, compact readily replaceable battery-powered unit that can be easily inserted into the base of the warming receptacle for heating the receptacle contents.

Still a further related object is to provide a warming receptacle or basket for bakery products that includes a simple, attractive, lightweight exterior receptacle with interior protective linings for wrapping around the bread product to maintain it at the desired serving temperature throughout the meal.

It is still a further object of the present invention to provide a heated breadbasket or warmer that is light in weight, can be passed about a dining table, and may also be utilized in an automobile, office or outdoor picnic area.

Still another object of the invention is to provide a serving container capable of keeping foods such a plates, casseroles, meat or vegetable dishes, rolls, bread, pastry, or other food products warm and at the desired temperature for eating, thereby enhancing the pleasure of a meal.

Still a further object is to provide a device of the foregoing character that insulates and prevents a drastic drop in oven-heated temperature of bakery products, and replenishes heat loss that occurs in a serving container.

A further object is to provide a heating unit that can be easily detached from the serving container and that further finds utility in connection with a lunchpail, lunchbag or picnic basket to provide warm foods.

Still a further object is to provide an economical method of providing heat energy in a warming container, by utilizing rechargeable batteries having a relatively long projected life.

In accordance with the foregoing objects, the present invention is embodied in a thermally insulated warming receptacle, such as a basket, with a detachable battery-powered electric heating unit incorporated therein.

DESCRIPTION OF THE INVENTION

The present invention is shown in the drawings with the preferred embodiment being shown in FIGS. 1 through 14 inclusive. The invention is embodied in a food warmer comprising a serving receptacle 30 suitable particularly for breads, rolls, pastries and bakery products. The receptacle 30 comprises a basket or container in which the bakery products may be served, together with an enclosing and protective napkin 31 inserted in the container 30 and wrapping the food products, and a battery-powered heating unit 32, located generally in the bottom of the receptacle, for applying heat to the contents thereof to maintain the foods at the desired optimum temperature for consumption.

The container or receptacle 30 may be of any configuration, cylindrical, square or rectangular, and made of any appropriate material such as wicker, reed, plastic, metal or wood.

The protective napkin 31 may be of any appropriate material or fabric, including thermal material. It may have a central opening 33 for exposing the heating unit 32 to the basket contents. The thermal napkins are formed of a thermal weave fabric, reflective layers, heat-insulating layers, and like insulating materials. A variety of napkins and linings will be described below.

An illustrated battery-powered heating unit 32 is utilized by mounting in the bottom of the receptacle 30 for applying warming heat to bakery products wrapped in the napkin 31 and placed in the basket or receptacle 30. An appropriate opening 34 is defined in the bottom of the receptacle 30 for receiving the heating unit 32.

The heating unit 32 is formed by a dish- or tray-like housing 35 having an internal rectangular frame 36 with appropriate contact electrodes 38, 39 adapted to retain one or more rechargeable batteries 40. The batteries 40 are connected to a heating element 41 mounted on an insulating panel 42 adapted to be received and supported within the housing 35 and enclosing the batteries 40. The housing 35 is enclosed by a cover 44 defining a heat transmitting structure or opening 45 with a grill or screen 46 to prevent direct contact between the wrapping napkin 31 and the heating element 41. The cover 44 may be formed with a groove 48 for receiving an upstanding peripheral edge 49 of the housing 35, thereby providing a friction fit between the cover and the housing. Alternatively, various fastening devices, such as screws 47 may be utilized. An on/off switch 50 is provided in the battery heating element circuit together with an indicator light 51 and a recharging receptacle 52.

Figure 10:
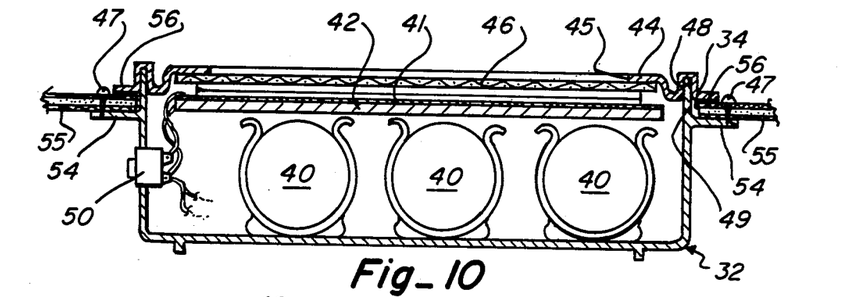
FIG. 10 is a section view taken substantially in the plane of line 10—10 on FIG. 3 and showing an illustrative battery-powered heating unit.
Figure 11:
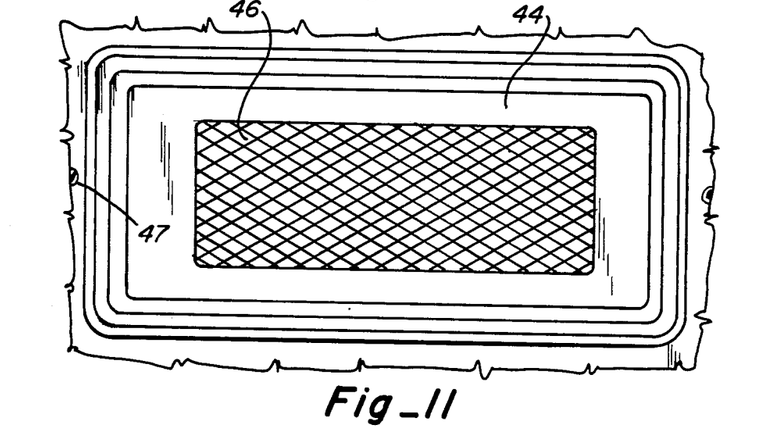
FIG. 11 is a top plan view of the heating unit shown in FIG. 10.
Figure 12:
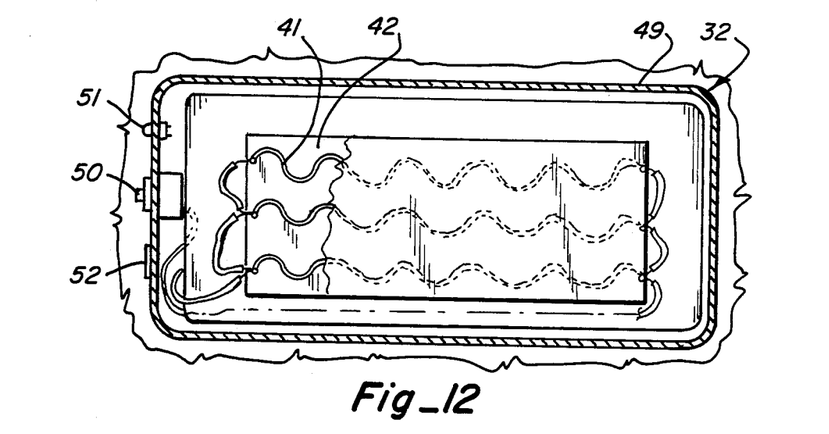
FIG. 12 is a top plan view of the heating unit shown in FIG. 10, but with the heat transmitting cover removed to illustrate the heating elements.
Figure 13:
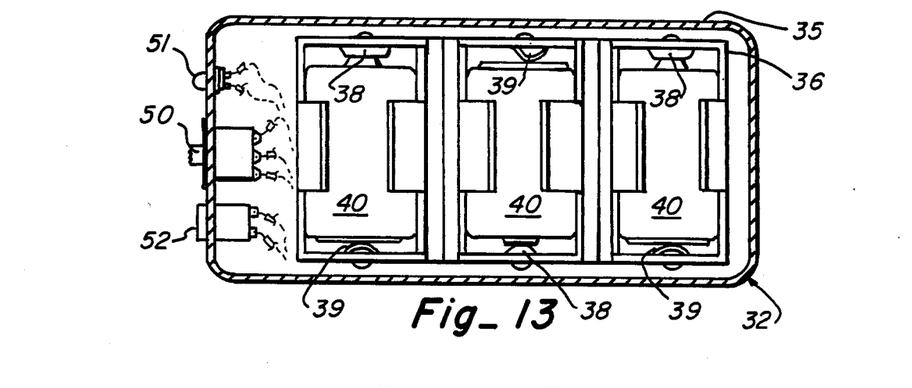
FIG. 13 is a top plan view of the heating unit shown in FIG. 10, but with the top cover and heating elements removed to show the battery power pack contained therein.

For retaining the battery unit within the receptacle, as shown in FIG. 10, the battery housing 35 includes an external flange 54 adapted to seat against the bottom 55 of the food receptacle with the lid or cover 44 being provided with a similar flange 56 adapted to be retained on the internal surface of the food receptacle when the cover 44 is snapped onto the housing 35.

The screen or mesh 46 is spaced from the heating element 41 in order to prevent direct contact with the receptacle napkin 31 or contents and the heating element 41.

The heating unit thus provided is a simple, compact unit that can be mounted in or removed from a food receptacle 30. In order to recharge the batteries 40 of the heating unit 32, the unit may be removed from the receptacle 30 and connected to a charging unit (not shown), and a substitute heating unit utilized with the food receptacle 30. Alternatively, the batteries can be recharged while the unit is mounted on the basket, or the batteries may be removed for recharging. Thus, the heating element is always maintained at full charge to provide the maximum heating effect to the food product receptacle.

Figure 14:
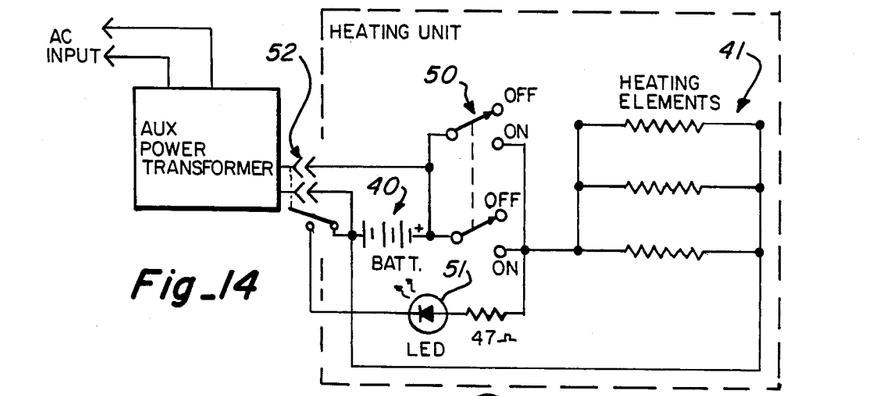
FIG. 14 is a circuit diagram of the electrical heating circuit of the heating unit shown in FIG. 10.

The electric heating circuit as shown in FIG. 14 may be modified to include appropriate controls in order to monitor and maintain the desired heating element temperature. Keeping in mind that the unit is not intended for cooking purposes, but only for warming purposes, the temperature of the heating element can be controlled, for example, to provide sufficient heat to maintain bakery products in their warm, edible condition without overheating or cooking. For casseroles and other main dishes, the heating element may be hotter, suitable controls being provided for that purpose.

Figure 7:
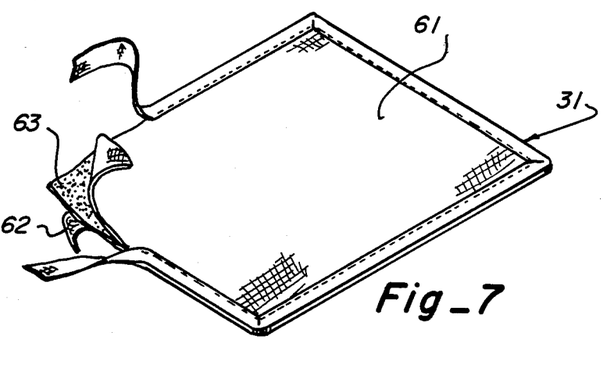
FIG. 7 is a plan view of a modified form of layered, thermal wrapping cloth for use with the breadwarmer shown in FIG. 1.
Figure 18:
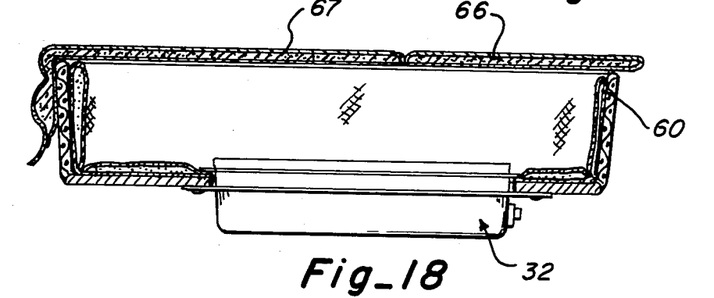
FIG. 18 is a section view taken substantially in the plane of line 18—18 on FIG. 17.

For warming baker products, a variety of wrapping napkins 31 may be utilized with the receptacle 30 and heating unit 32. The basket or receptacle 30 may be lined with an insulating lining 60 such as a foam or knit insulating material (FIG. 18). The napkin itself may be formed of thermally insulating material, either knit, foam, or with reflecting fabric layers 61, 62 on either side of an insulating layer 63 as shown in FIG. 7.

Figure 1:
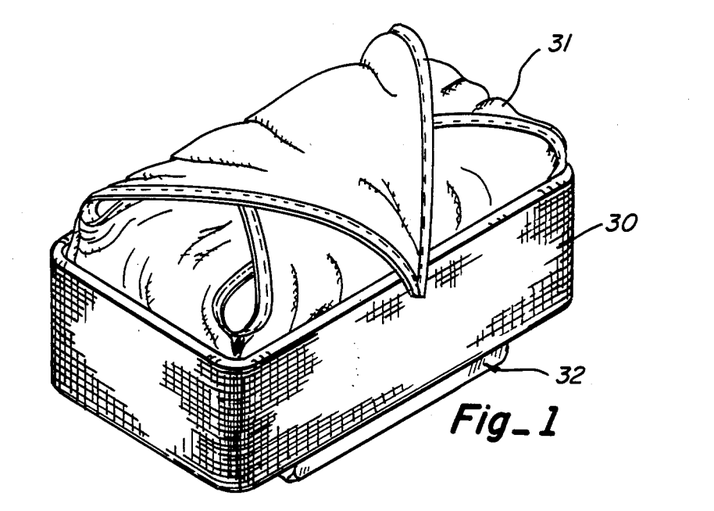
FIG. 1 is a perspective view of a preferred form of breadwarmer embodying the present invention.
Figure 2:
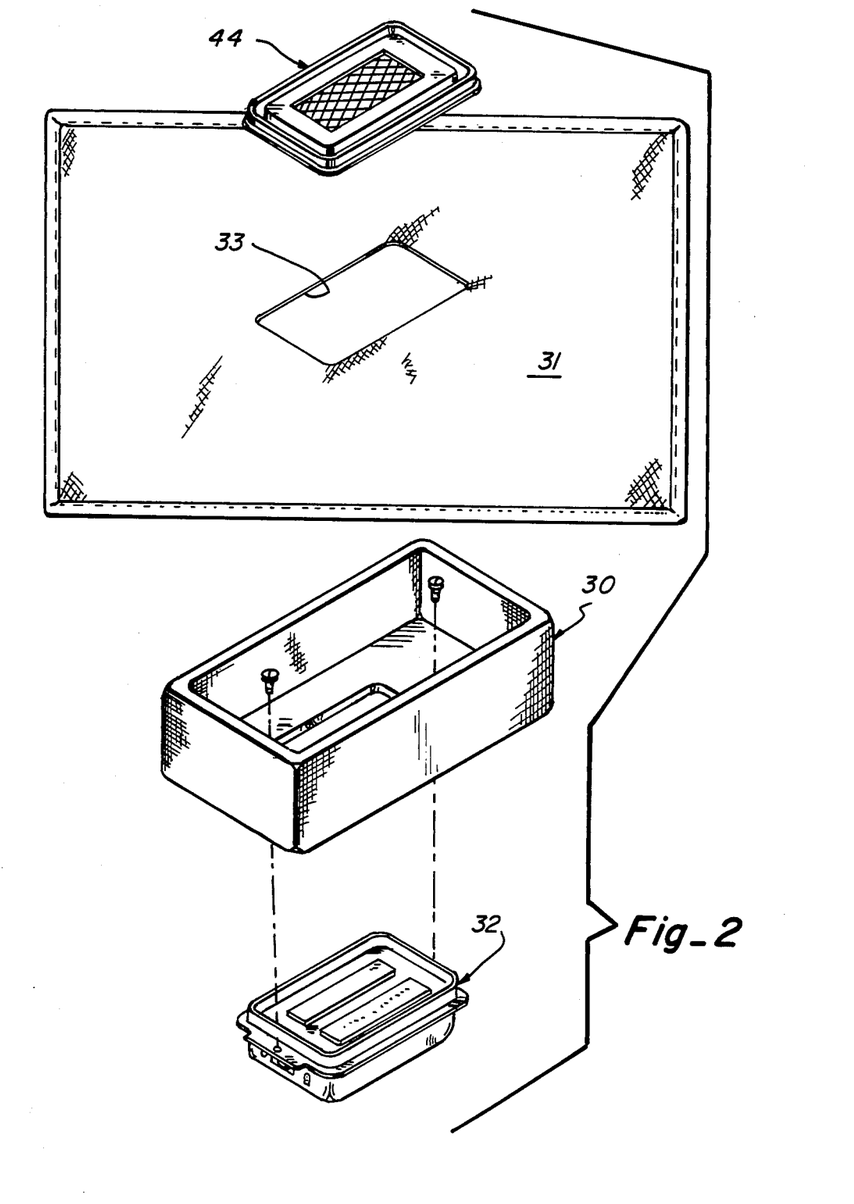
FIG. 2 is an exploded view in perspective of the breadwarmer shown in FIG. 1.
Figures 3, 4, 5:
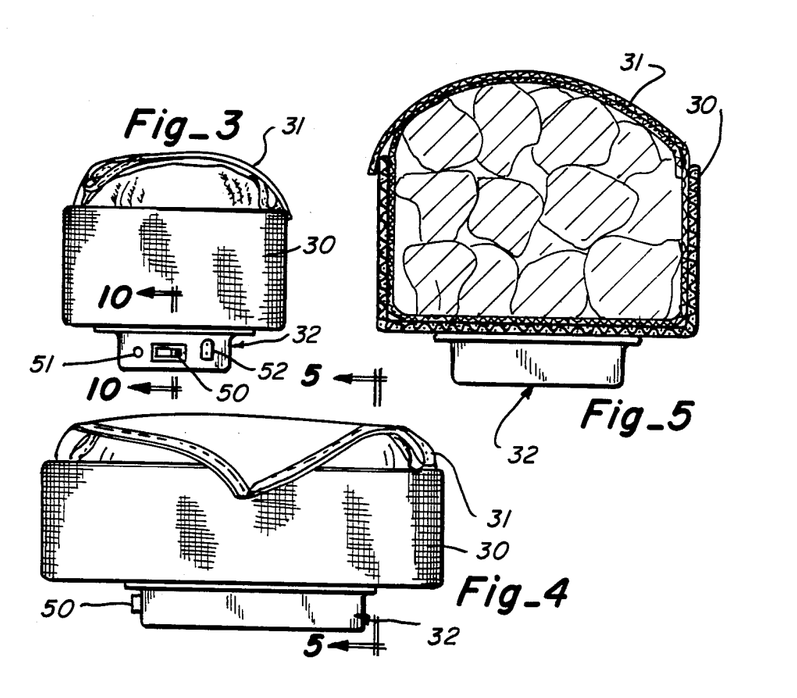
FIG. 3 is an end elevation view of the breadwarmer shown in FIG. 1.
FIG. 4 is a side elevation view of the breadwarmer shown in FIG. 1.
FIG. 5 is a section view taken substantially in the plane of line 5—5 on FIG. 4.
Figures 6, 8, 9:
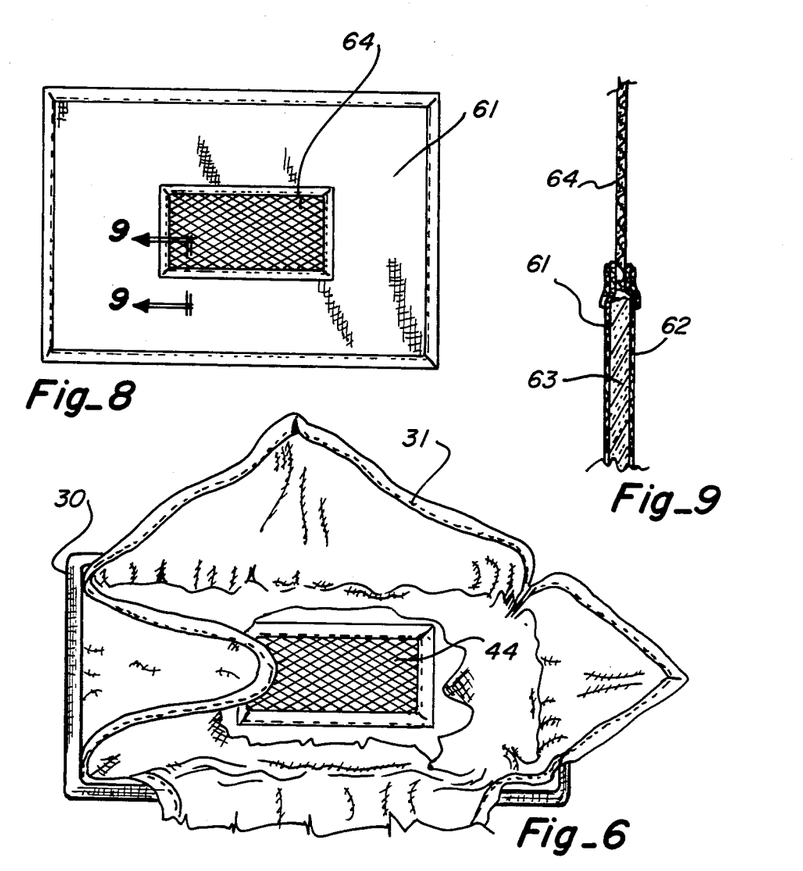
FIG. 6 is a top plan view of the breadwarmer shown in FIG. 1 with the wrapping cloth partially unfolded.
FIG. 8 is still a further modified form of wrapping cloth for use with the breadwarmer shown in FIG. 1.
FIG. 9 is a section view taken substantially in the plane of line 9—9 on FIG. 8.

A specialty napkin may be utilized with a mesh-filled opening 64 in the center thereof, adapted to register with the heat-transmitting grill 46 in the bottom of the basket or receptacle 30, as shown in FIGS. 8 and 9. Such a napkin having a sewn-in grid or open mesh 64 may be completely washable for sanitary purposes when used in a restaurant or other food service operation.

Figure 15:
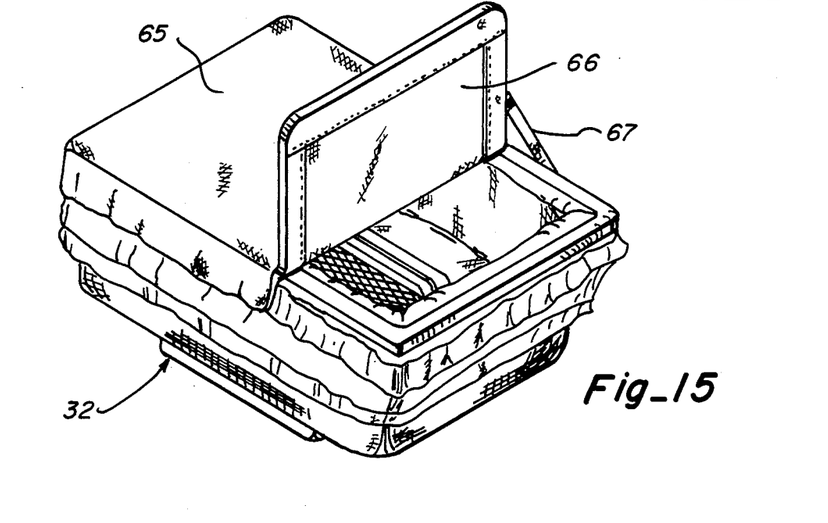
FIG. 15 is a perspective view of a modified form of breadwarming device embodying the present invention and utilizing an interior heat-retaining lining in the container, and an exterior cover with an access flap, and showing the flap partially opened.
Figure 16:
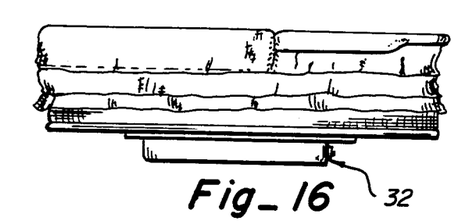
FIG. 16 is a side elevation view of the warming device shown in FIG. 15, but with the flap closed.
Figure 17:
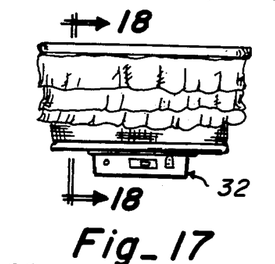
FIG. 17 is an end elevation view of the warming device shown in FIG. 15.

A variety of receptacle or basket constructions may be utilized. As shown in FIG. 15, the basket may be provided with a permanently affixed lid 65 and a hinged lid or flap 66. The latter is adapted to be self-closing to provide a cover on the bakery goods receptacle or basket. An elastic strap 67 biases the lid to the closed position. Appropriate fabric covers are utilized.

Figure 19:
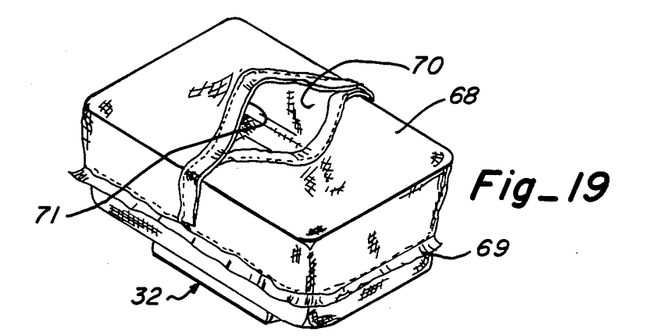
FIG. 19 is a perspective view of a further modified form of warming device, including a container with an interior heat-retaining lining and an exterior cover with an elastic opening therein.
Figure 20:
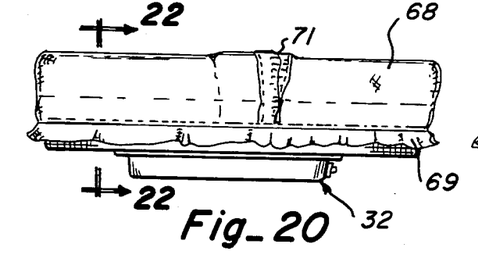
FIG. 20 is a side elevation view of the warming device shown in FIG. 19.
Figure 21:
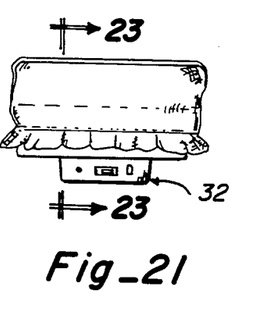
FIG. 21 is an end view of the warming device shown in FIG. 19.

Still a further alternative is to utilize a fabric cover 68 with an elastic band 69 around the periphery thereof, so that the cover may be inserted over the top opening 70 of the basket. A central slit 71 in the cover may also be provided with elastic so as to be self-closing and yet provide a ready access to the interior contents of the basket.

A more rigid, shaped cover such as a cozy (not shown) may be utilized over the top of the basket in order to retain the heat therein added by the heating unit. If desired, the basket may have handles or a permanently affixed lid to provide for ready transportation of the bakery products. Such a construction would find particular utility in connection with products for consumption in an automobile or on a picnic.

Figures 22, 23, 24:
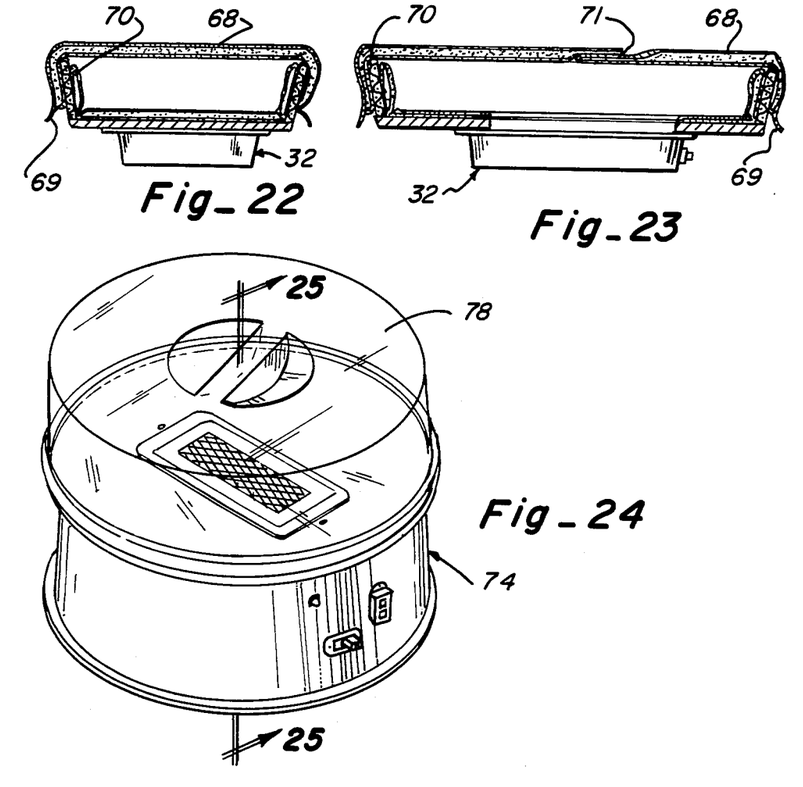
FIG. 22 is a section view taken substantially in the plane of line 22—22 on FIG. 20.
FIG. 23 is a section view taken substantially in the plane of line 23—23 on FIG. 21.
FIG. 24 is a perspective view of a heated, covered plate warmer embodying the present invention.
Figure 25:
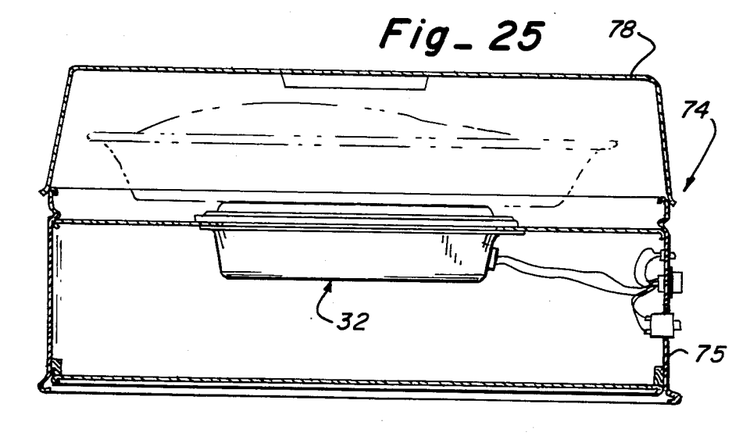
FIG. 25 is a section view taken substantially in the plane of line 25—25 on FIG. 24.

A further modification of the present invention, in the form of a plate warmer 74, is shown in FIGS. 24 and 25. In this modification, the battery unit 32 as described above is mounted in a plate supporting cylindrical base 75 having an upper panel 76 for supporting a plate or dish to be warmed. A cylindrical cover 78, which may be metal or clear plastic, snaps onto the base to cover a plate or dish. External controls on the base 75 control the heating unit 32.

While certain illustrative embodiments of the present invention have been shown in the drawings and described above in detail, it should be understood that there is no intention to limit the invention to the specific forms disclosed. On the contrary, the intention is to cover all modifications, alternative constructions, equivalents, and uses falling within the spirit and scope of the invention as expressed in the appended claims.

I claim:

1. A food-serving device for holding and serving a warm food product, comprising a receptacle holding a food product, a wrapper within said receptacle for enclosing said food product, and a battery-powered heater for applying heat to said receptacle and wrapper for warming said food product, characterized in that said battery-powered heater comprises a shallow tray housing, means in said housing supporting a battery pack, a heating element, means supporting said heating element in said housing above said battery pack, a control connecting said battery pack with said heating element for controllably applying electric energy from said battery pack to said heating element, a cover for said housing enclosing said battery pack and heating element, and heat transmitting openings in said cover, receptacle, and wrapper for transmitting heat generated by said battery powered heating element to said food product in order to maintain said food product in a warm ready-to-eat condition.

2. A food-serving device for holding and serving a warm food product, comprising a receptacle holding a food product, a wrapper within said receptacle for enclosing said food product, and a battery-powered heater for applying heat to said receptacle and wrapper for warming said food product, characterized in that said battery-powered heater comprises a shallow tray housing, means in said housing supporting a battery pack, a heating element, means supporting said heating element in said housing above said battery pack, a control connecting said battery pack with said heating element for controllably applying electric energy from said battery pack to said heating element, a cover for said housing enclosing said battery pack and heating element, and heat transmitting openings in said cover, receptacle, and wrapper for transmitting heat generated by said battery powered heating element to said food product, said wrapper being flexible and having a thermal lining, and said cover having a foraminous heat transmitting grid therein whereby heat is transmitted from said battery-powered heating element to said food holding receptacle and wrapper in order to maintain said enclosed food product in a warm, ready-to-eat condition.

3. A food serving device as defined in claim 2 wherein said shallow tray housing cover removably affixes said shallow tray housing and thermally lined wrapper to said receptacle.

4. A food serving device as defined in claim 3, further characterized in that said means for supporting said heating element includes a upwardly directed reflective surface for directly heat generated by said heating element into the juxtaposed receptacle and wrapper.

5. A food serving device as defined in claim 4 wherein said battery is rechargeable.

6. A food serving device as defined in claim 5, further including an indicator light for indicating energization of said heater.

* * * * *